United States Patent [19]

Phillips

[11] Patent Number: 4,767,954
[45] Date of Patent: Aug. 30, 1988

[54] SOLID STATE COMMUTATED LINEAR MOTOR WITH AN IRONLESS MULTIPHASE ARMATURE

[75] Inventor: Edward H. Phillips, Middletown, Calif.

[73] Assignee: Compact Spindle Bearing Corporation, Middletown, Calif.

[21] Appl. No.: 850,964

[22] Filed: Apr. 11, 1986

[51] Int. Cl.$^4$ .............................................. H02K 41/00
[52] U.S. Cl. ........................................ 310/12; 318/135
[58] Field of Search ...................... 318/135, 688, 696; 310/12–14

[56] References Cited

U.S. PATENT DOCUMENTS

4,151,447  4/1979  von der Heide ..................... 318/135

Primary Examiner—Mark O. Budd
Assistant Examiner—Judson H. Jones
Attorney, Agent, or Firm—Limbach, Limbach & Sutton

[57] ABSTRACT

An improved solid state commutated linear motor with an ironless multiphase armature is disclosed which has a magnetic field array having periodic alternating polarity, an ironless multiphase armature, and a solid state commutating system for driving a moving element and positioning it with respect to a reference element. In one embodiment, the magnetic field array is elongated and fixedly located with respect to the reference element, and the ironless multiphase armature is fixedly located with respect to the moving element. In a second embodiment, the ironless multiphase armature is elongated and fixedly located with respect to the reference element, and the magnetic field array is fixedly located with respect to the moving element. The magnetic field array is generated by an array of spaced alternate north and south poled magnets having an inter-pole distance L. The ironless multiphase armature is comprised of coils having a center-line span equal to the inter-pole distance L, wherein the coils are interleaved and staggered to form the various phases. Solid state switches are used to commutate the phases by first faulting a phase as it approaches a space between magnetic poles and then reversing the connections of that phase as it leaves the space between the magnetic poles.

45 Claims, 9 Drawing Sheets

| SWITCH NO. | A | A-B | B | B-C | C | C-D | D | D-E | E | E-F | F | F-A |
|---|---|---|---|---|---|---|---|---|---|---|---|---|
| 74a | X | X | | | | | | | X | X | X | X |
| 74b | | X | X | X | X | X | X | X | | | | |
| 76a | | X | X | X | | | | | | | | |
| 76b | | | | X | X | X | X | X | | | | |
| 78a | X | X | | | | | | | | X | X | X |
| 78b | | | | | | | | X | X | X | | |
| 80a | | | | | X | X | X | | | | | |
| 80b | | | | | | X | X | X | X | | | |
| 82a | X | X | X | X | | | | | | | | X |
| 82b | | | | | | | | | X | X | X | |
| 84a | | | | | | X | X | X | X | X | X | X |
| 84b | X | X | X | X | X | X | | | | | | X |

| PHASE NO. | | | | | | | | | | | | |
|---|---|---|---|---|---|---|---|---|---|---|---|---|
| 1 | + | + | − | − | − | − | − | − | + | + | + | + |
| 2 | + | + | + | + | − | − | − | − | − | − | + | + |
| 3 | + | + | + | + | + | − | − | − | − | − | − | + |

SOLID STATE COMMUTATED LINEAR MOTOR WITH AN IRONLESS MULTIPHASE ARMATURE

TECHNICAL FIELD

This invention relates generally to linear motors of a type commonly utilized in a servo controlled positioning system for driving a moving element and positioning it with respect to a reference element and more specifically, this invention relates to an improved solid state commutated linear motor having an ironless multiphase armature with significantly improved thrust capability.

BACKGROUND ART

This type of linear motor has a magnetic field array comprised of first and second arrays of magnets. The magnets of each array are coupled magnetically by way of a ferromagnetic bar for providing a magnetic field of a selected geometrical pattern. The ferromagnetic bars are parallel to one another. Typically the linear motor also has a solid state commutated armature mounted for relative axial movement between the two bars and providing thrust when energized by current in a selected manner.

Many linear motors of the type described above are disclosed in the patent literature. Three examples of such linear motors are those shown in U.S. Pat. No. 4,151,447 entitled LINEAR MOTOR and issued Apr. 24, 1979 to Johann von der Heide and Georg F. Papst; U.S. Pat. No. 4,187,453 entitled ELECTRIC MOTOR DRIVE SYSTEM and issued Feb. 5, 1980 to J. Kirkwood H. Rough; and U.S. Pat. No. 4,396,966 entitled LOW MASS ACTUATOR SYSTEM FOR MAGNETIC RECORDING DISKS WITH HALF STRENGTH END POLES and issued Aug. 2, 1983 to Robert A. Scranton, David A. Thompson and Thomas K. Worthington. One problem common to all of the linear motors described in the above cited U.S. Patents is their inefficient use of the space available within their magnetic fields for generating thrust with the current in their armatures. In two cases, a portion of the available magnetic field is cut by current flowing the wrong way through a portion of the armature. Thus, the applied current partially generates reverse thrust. The other case shows an armature winding having a very low conductor stacking factor and hence even poorer efficiency.

U.S. Pat. Nos. 4,151,447 and 4,396,966 show an array of magnets mounted on each of two parallel ferromagnetic bars wherein the magnets are sequentially oppositely poled and the bars are mounted with respect to one another such that each magnet of each array of magnets is positioned opposite an oppositely poled magnet of the other array of magnets. U.S. Pat. Nos. 4,151,447 and 4,396,966 also show two coils spacially positioned in quadrature with respect to the arrays of magnets wherein each coil is wound such that when one side of the coil is positioned between a first pair of magnets the other side of the coil is positioned between an adjacent pair of magnets. Current is forced to flow through each coil at all times. The direction of current flow in either coil is reversed as that coil passes between the magnets of either array. Thus the current flowing in that coil is wasted at that position because it is distributed equally between opposing magnetic fields and has a net contribution of zero thrust. For other positions a portion of the current flowing in each coil is partly wasted depending on its spacial relationship with the arrays of magnets.

Also, any back e.m.f. present due to relative velocity between the armature and the magnetic field opposes only the net thrust producing portions of the current flowing in each coil. Since the control shown in U.S. Pat. No. 4,151,447 is a voltage control, the coil of the linear motor disclosed therein which produces the least thrust will always have the larger current. When such a coil is positioned between the magnet poles at the location where the direction of current flow is reversed, the net back e.m.f. is zero and the current is limited only by the series resistance of the coil and its drive amplifier.

U.S. Pat. No. 4,396,966 additionally shows end magnets of half strength. This is said to have the advantage of reducing leakage flux emanating from the linear motor. Also, it is evident that since only half of the flux from each magnet flows between magnets in the ferromagnetic bars then the ferromagnetic bars of the linear motor of U.S. Pat. No. 4,396,966 may be made half the size of the ferromagnetic bars of the linear motor of U.S. Pat. No. 4,151,447.

U.S. Pat. No. 4,187,453 shows two serpentine format windings formed via printed circuit techniques and placed in quadrature with respect to arrays of oppositely poled magnets similar to those of U.S. Pat. Nos. 4,151,447 and 4,396,966. The linear motor of U.S. Pat. No. 4,187,453 operates as a stepping motor. However, that linear motor could be controlled as a servo motor, as explained above, although it additionally shows a very low conductor stacking factor, as also explained hereinabove. It is cited herein both because it illustrates a method of constructing a multi-poled linear motor armature and because it illustrates a "moving field" configuration of linear motor wherein the linear motor has an elongated armature and a foreshortened magnetic field array.

What is needed is a linear motor having an ironless multiphase armature wherein no portion of the current flowing through any of the coils of the ironless multiphase armature generates reverse thrust. Further, it is desired that the coils of the ironless multiphase armature possess a high conductor stacking factor. It would also be desirable to provide a "moving field" configuration of a linear motor having an improved conductor stacking factor. Also, what is needed is a solid state switching arrangement for commutating the coils of the multiphase armature of the linear motor wherein all current conducting coils of the armature are connected in series so that each current conducting coil carries the same current.

SUMMARY OF THE INVENTION

These and other problems of previous linear motors are overcome by the present invention of an improved solid state commutated linear motor with an ironless multiphase armature including an array of magnets mounted on each of two parallel ferromagnetic bars wherein the magnets are sequentially oppositely poled, the bars are mounted with respect to each other such that each magnet of each array of magnets is positioned opposite an oppositely poled magnet of the other array of magnets, the axial length of the space between all magnets is equal to the ratio of the inter-pole distance between full strength magnets of each array of magnets divided by the number of phases and further wherein the axial length of the end magnets of each array of magnets is half of the length of the full strength magnets (and therefore of half strength); an ironless multiphase armature with at least two phases each comprised of at least one coil whose axial center-line span is equal to the inter-pole distance between full strength magnets wherein the coils are wound in a multi-plane fashion and are interleaved in a staggered manner when assembled and potted to form the ironless multiphase armature; a "moving armature" configuration wherein the poles of the armature are fewer in number than the poles of the arrays of magnets and wherein the phases of the armature are series connected so that each current conducting coil carries the same current; a commutation program of solid state switching of the phases according to a truth table wherein each phase is sequentially switched into a faulted condition and then switched into a reverse connected state as it passes opposite the space between magnets in the arrays of magnets; and a switching circuit able to perform the desired switching in a bi-directional manner between phases and output terminals of a servo amplifier drive circuit.

An alternate embodiment of the present invention comprises an improved solid state commutated linear motor with an ironless multiphase armature including an array of magnets mounted on each of two parallel ferromagnetic bars wherein the magnets are sequentially oppositely poled, the bars are mounted with respect to each other such that each magnet of each array of magnets is positioned opposite an oppositely poled magnet of the other array of magnets, the axial length of the space between all magnets is equal to the ratio of the inter-pole distance between full strength magnets of each array of magnets divided by the number of phases and further wherein the axial length of the end magnets of each array of magnets is half of the length of the full strength magnets (and therefore of half strength); an ironless multiphase armature with at least two phases each comprised of multiple coils whose axial center-line span is equal to the inter-pole distance between full strength magnets wherein the coils are wound in a multi-plane fashion and are interleaved in a staggered manner when assembled and potted to form the ironless multiphase armature; a "moving field" configuration wherein the poles of the arrays of magnets are fewer in number than the poles of the armature and wherein the phases of the armature are series connected so that each current conducting coil carries the same current; a commutation program of solid state switching of the phases according to a truth table wherein each phase is sequentially switched into a faulted condition and then switched into a reverse connected state as it passes opposite the space between magnets in the arrays of magnets; and a switching circuit able to perform the desired switching in a bi-directional manner between phases and output terminals of a servo amplifier drive circuit.

Accordingly, it is the principal object of this invention to provide an improved solid state commutated linear motor having an ironless multiphase armature wherein no portion of the current flowing through any of the coils of the ironless multiphase armature generates reverse thrust.

Another object of this invention is to provide a method of fabrication for the coils of the ironless multiphase armature of the linear motor wherein the coils possess a high conductor stacking factor.

Another object of this invention is to provide a solid state commutated linear motor with an ironless multiphase armature having a "moving armature" configuration wherein an ironless multiphase armature moves within an alternately poled magnetic field array whose length is at least equal to the length of the ironless multiphase armature plus the length of travel of the armature.

Another object of this invention is to provide a solid state commutated linear motor with an ironless multiphase armature having a "moving field" configuration wherein an alternately poled magnetic field moves over an ironless multiphase armature whose length is at least equal to the length of the alternately poled magnetic field plus the length of travel of the moving field.

Another object of this invention is to provide a solid state commutated linear motor with an ironless multiphase armature wherein the phases are series connected so that each current conducting coil carries the same current.

Another object of this invention is to provide a solid state commutated linear motor with an ironless multiphase armature wherein the phases are switched in polarity in accordance with a truth table which includes overlap in the switching sequence so that transient open circuit conditions are not possible.

Still another object of this invention is to provide a solid state switching circuit able to switch current on-and-off in a bi-directional manner between phases and output terminals of a servo amplifier drive circuit.

These and other objectives, features and advantages of the present invention will become more apparent upon consideration of the following detailed description and accompanying drawings.

DESCRIPTION OF THE PREFERRED EMBODIMENTS

Figure 1:
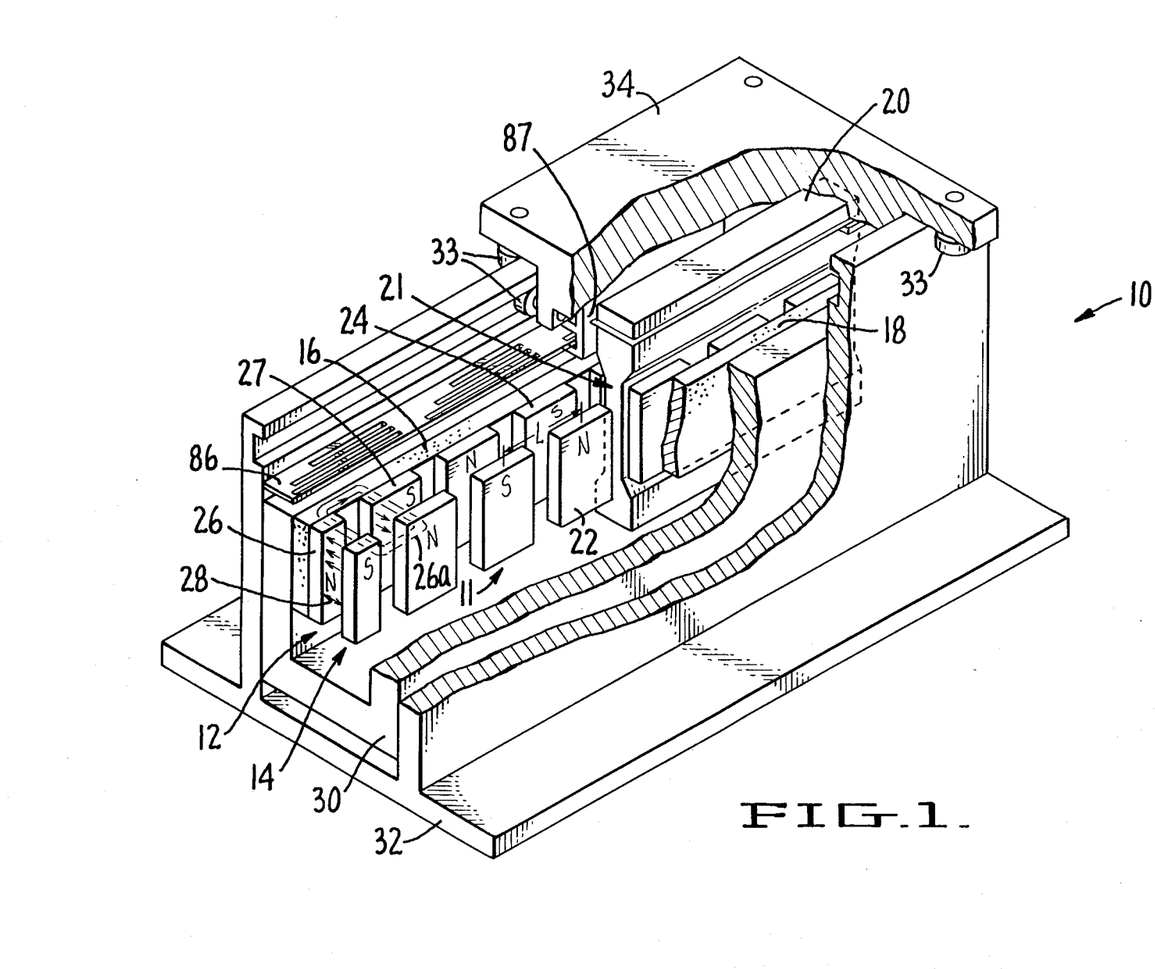
FIG. 1 is an isometric drawing of a "moving armature" version of an improved solid state commutated linear motor with an ironless multiphase armature in accordance with the preferred embodiment of the present invention.

Referring now to FIG. 1, there is shown an improved solid state commutated linear motor with an ironless multiphase armature 10 of a "moving armature" configuration wherein a magnetic field array 11 comprising at least one of two arrays of magnets 12 and 14 and two ferromagnetic bars 16 and 18 encompasses and interacts with an ironless multiphase armature 20. In the "moving armature" configuration of the present invention, the length of the magnetic field array 11 is at least equal to the length of the ironless multiphase armature 20 plus the length of travel, relative to the magnetic field array 11, of the ironless multiphase armature 20.

The arrays of magnets 12 and 14 each comprise alternate north poled magnets 22 and south poled magnets 24 which are spaced apart from one another by a distance equal to the inter-pole distance, L, divided by the number of phases in the ironless multiphase armature 20. The array of magnets 12 and 14 are positioned on the ferromagnetic bars 16 and 18 such that each north poled magnet 22 on one of the ferromagnetic bars is located opposite a south poled magnet 24 on the other of the ferromagnetic bars.

Each end magnet 26 is half the width of the non-end magnets. Thus the flux from each end magnet 26 is conducted through its corresponding ferromagnetic bar 16 or 18 and is returned via half of a neighboring north poled magnet 22 or south poled magnet 24, crosses the air gap 28 provided for passage of the multiphase ironless armature 20, passes through the opposite magnets and ferromagnetic bar, and crosses the air gap 28 a second time. See arrows 26a, FIG. 1. Since half of the flux from the neighboring north poled magnet 22 or south poled magnet 24 must then be returned to it in a similar fashion with respect to its next neighboring magnet and so on down each array of magnets, it is apparent that the ferromagnetic bars 16 and 18 can be sized for carrying half of the flux coming from each non-end magnet 27. It is to be understood that in the preferred embodiment of the present invention the magnets used in the arrays of magnets 12 and 14 are of the type having their poles at their broadest faces. Thus, as shown in FIG. 1, the faces of the magnets in array 12 oppose faces of magnets in array 14. These opposing faces comprise the poles of the magnets. As such, for a magnet having a north pole face facing into the gap 28, such magnet has a south pole face abutting the ferromagnetic bar.

The ferromagnetic bars 16 and 18 are mounted on a channel 30 which is in turn mounted on a machine frame 32. The ironless multiphase armature 20 is mounted on a machine slide 34 which is supported by guideway bearings 33 and thereby guided for linear movement along the magnetic field array 11.

The ironless multiphase armature 20 includes at least two phases. The phases are selectively and equally spaced along a common axis with the magnetic field array 11 such that each of the phases can be commutated in sequence, as the magnetic field cutting portions 21 of the armature 20 pass the spaces between the north poled magnets 22 and south poled magnets 24, without perturbing the continuous thrust characteristics of the present invention. The magnetic field cutting portions 21 are defined as the portion of armature 20 whioh is positioned within gap 28. Each of the phases includes at least one coil whose axial center-line span between its magnetic field cutting portions 21 is equal to the inter-pole distance L, so that each field cutting portion 21 is always identically positioned with respect to each one of a neighboring set of a north poled magnet 22 and a south poled magnet 24.

Figure 2:
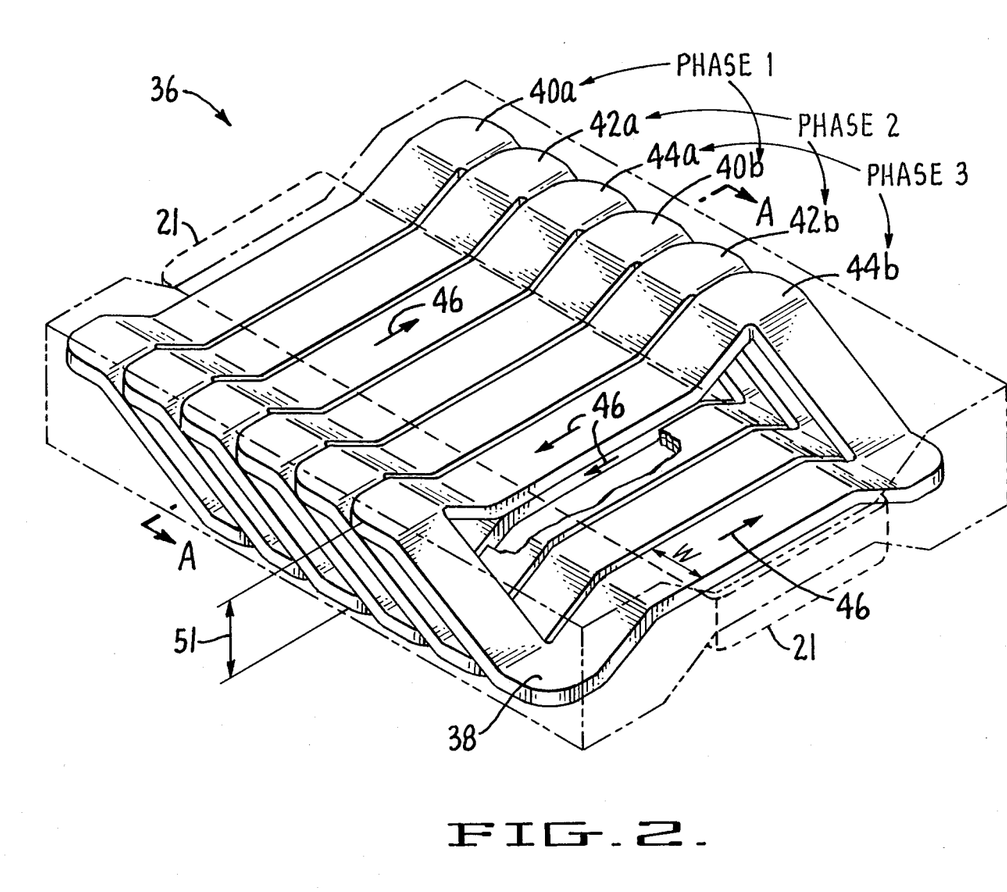
FIG. 2 is a cutaway isometric drawing of an armature portion of the improved solid state commutated linear motor with an ironless multiphase armature of FIG. 1.

The ironless multiphase armature 20 can include more than two phases and each phase can include more than one coil, wherein the coils comprising a phase are series connected as described below. FIG. 2 is a cutaway isometric drawing showing details of a two coil per phase, three phase armature 36 which may be utilized as the ironless multiphase armature 20 in the improved solid state commutated linear motor 10. The two coil per phase, three phase armature 36 is comprised of six identical coils 38 wherein each coil 38 is interleaved with the other coils in a staggered manner, wired together and potted, as described hereinafter. The coil width W of each coil 38 is equal to the inter-pole distance L divided by the number of phases (or L/3 for the two coil per phase, three phase armature 36) while the axial center-line span, S, of each coil 38 (see FIG. 3) is equal to the inter-pole distance L as described above. The series connected pairs of individual coils 38 may be further identified by phase as follows: Phase 1 is comprised of coils 40a and 40b, phase 2 is comprised of coils 42a and 42b, and phase 3 is comprised of coils 44a and 44b. Each of these pairs of coils overlap with -h other-to form the interleaved and staggered eac assembly. Thus, it can be seen in FIG. 2 that the end portion of coil 44b which lies along the upper portion of armature 36 is positioned above the end portion of coil 44a which lies along the bottom portion of armature 36. Disposed between these end portions of coils 44a and 44b are parts of the end portions of coils 42b and 40b. See arrows 51, FIG. 2.

It is apparent that each of the pairs of coils which form a phase should be series connected in counter fashion so that the current passing through each will go in the same direction at each overlapping position, arrow 51, as indicated by the arrows 46. It is also apparent that within the overlapped region the two coil per phase, three phase armature 36 has the maximum possible conductor stacking factor. An ironless multiphase armature 20 comprising a large number of coils formed as described herein would therefore have a very high average conductor stacking factor.

Figure 3:
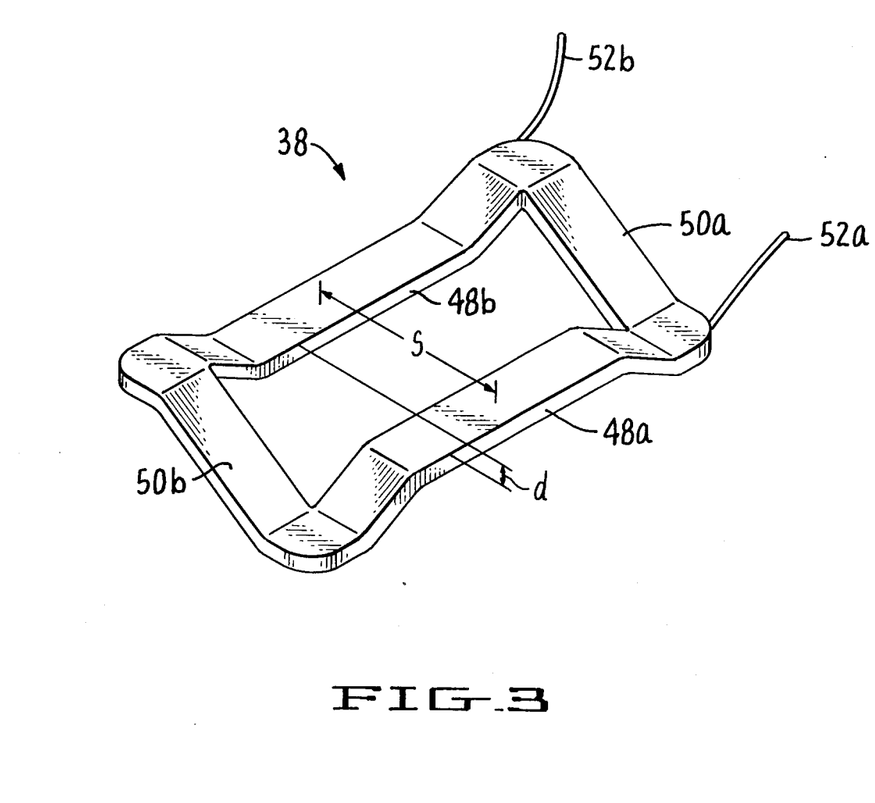
FIG. 3 is an isometric drawing of a coil portion of the armature shown in FIG. 2 which is wound in a selected offset fashion.

A particular coil configuration that can be used for the coil 38 is shown in FIG. 3. Magnetic field cutting portions 48a and 48b, also referred to as the active portions, are parallel but transversely offset from one another by a stagger distance d. End-turn portions 50a and 50b should be offset and sloped sufficiently to accommodate the interleaved and axially spaced positioning of the coils 38 as shown in FIG. 3. This results in a continuously offset stack of the coil end-turn portions 50a and 50b equal in total thickness to at least the number of phases plus one. This means that there is a nominal four high stacking of end-turn portions 50a and 50b in the two coil per phase, three phase armature as is shown in FIG. 2 at arrows 51. As such, there is provided a series of active portions 48b from each of the coils 38, which active portions are abutted up against one another to form a planar active portion face. This face lies along the upper portion of armature 36 as it is oriented in FIG. 2. Similarly, there is provided a series of active portions 48a from each of the coils 38, which active portions are abutted against one another to form a planar active portion face which lies along the bottom portion of armature 36 as it is oriented in FIG. 2. Thus, from FIGS. 2 and 3 it can be appreciated that the distance between center lines of abutted active portions of successive phases (for example, phases 1 and 2) of the ironless multiphase armature 20 is equal to the inter-pole distance (or intermagnet distance) L divided by the number of phases present in the armature 20. It also follows that the coils which form a phase are themselves separated from one another by the inter-pole distance L.

Figure 4A:
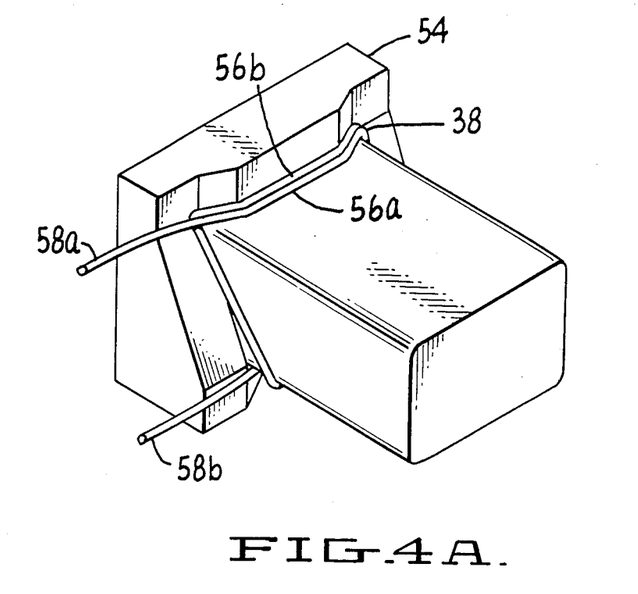
FIGS. 4A and 4B are isometric drawings of a partially wound coil on a winding mandrel which illustrate a method of winding the coil of FIG. 3.
Figure 4B:
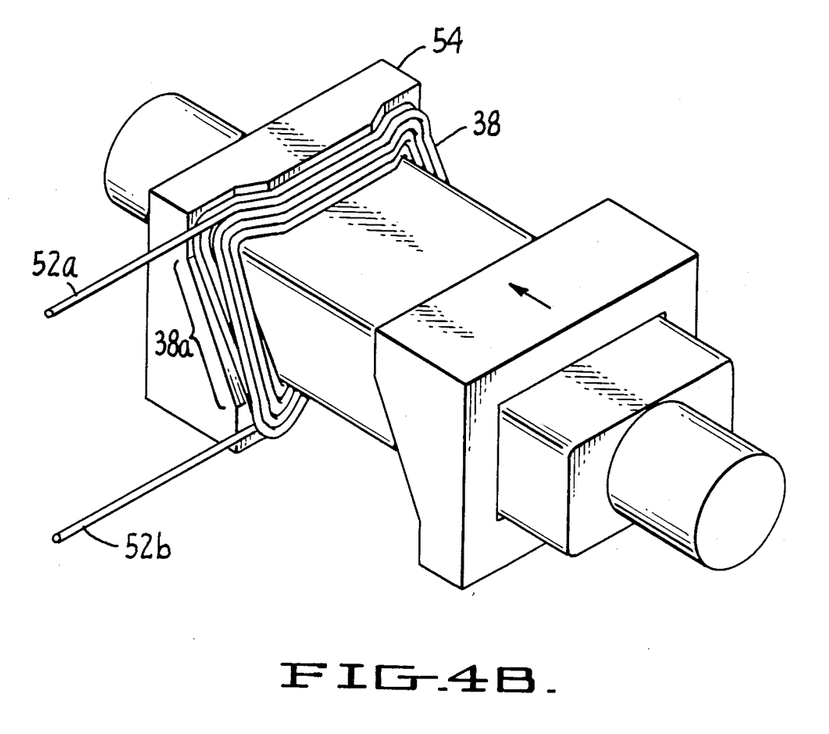

Further, it is for leads 52a and 52b to be on the outside of each coil 38 because passage of one of the leads from the inside of the coil 38 to the outside would further increase the thickness of the coil 38 at some position along the coil. FIGS. 4A and 4B illustrate a method of winding the coil 38 wherein both leads 52a and 52b will be on the outside of the coil as desired. FIG. 4A shows a partially wound coil 38 on a winding mandrel 54 wherein two central turns 56a and 56b of the coil 38 have been placed on the mandrel 54 in counter-wound directions with respect to each other by pulling wire ends 58a and 58b around the mandrel in counter directions. Each pair of turns thereafter is wound directly over the preceding pair as shown in FIG. 4B until finally the remaining wire ends 58a and 58b become the leads 52a and 52b as the final turns are completed and the coil assumes its final form as shown in FIG. 3.

What is obtained is a coil 38 which has a thickness approximately equal to two times the diameter of the wire being used. The width of coil is a function of the number of turns of wire in the coil, e.g., the number of turns divided by two in the example of FIGS. 4A and 4B, where the coil is two wire diameters thick. It is to be noted that except for the first turn, see region 38a, the successive turns of wire in the coil 38 are stacked on top of one another in a parallel fashion and do not cross.

Figure 5:
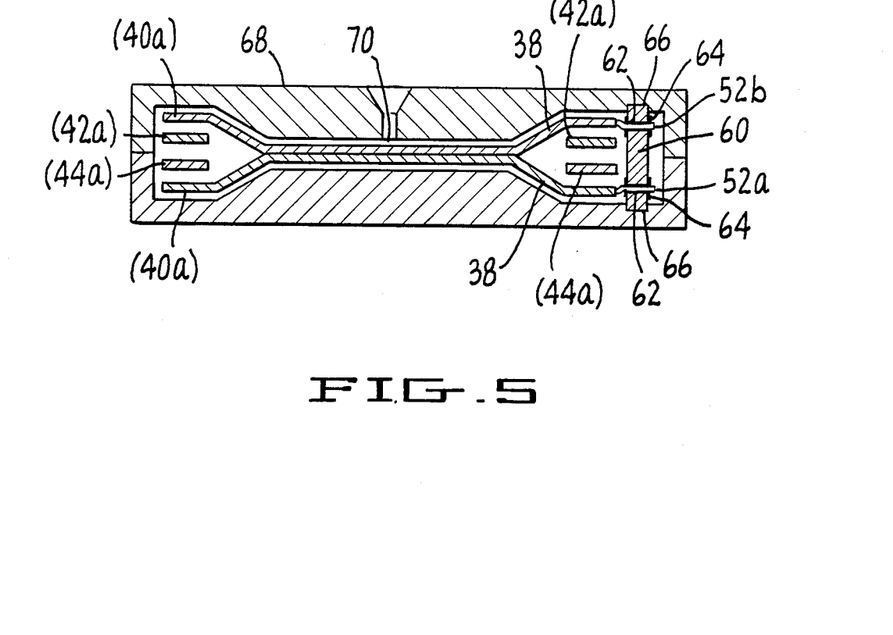
FIG. 5 is a sectional view of the armature shown in FIG. 2 showing a printed circuit board utilized for holding the coils of the armature in place during a potting operation.

FIG. 5 is a sectional view showing further details of construction of the ironless multiphase armature 20. Each coil 38 is positioned in a selected position proximate to a printed circuit board 60 with its leads 52a and 52b projecting through plated through holes 62 formed in the printed circuit board 60. The various leads 52a and 52b are soldered to pads 64 surrounding each end of the plated through holes 62 in order to provide electrical connection and locate the coils 38 in their selected positions proximate to the printed circuit board 60. The printed circuit board 60 is then positioned in notches 66 in a mold 68 wherein potting compound 70 is poured and cured to form the ironless multiphase armature 20.

For purposes of illustration, assume a vertical sectional view in FIG. 5 of the ironless multiphase armature 20 positioned within the mold 68 taken, for example at line A—A of FIG. 2. As such, what is shown are portions of coils 40a, 42a, and 44a, as indicated in parenthesis.

Figure 6:
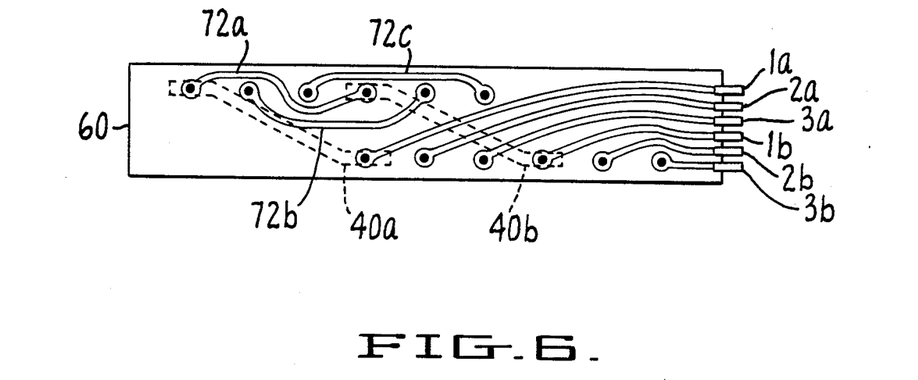
FIG. 6 is a plan view of the printed circuit board shown in FIG. 5.

FIG. 6 is a plan view of the printed circuit board 60 showing traces 72a, 72b and 72c which form the series interconnections between the coils 40a and 40b 42a and 42b, and 44a and 44b, respectively. Also shown are terminals 1a and 1b, 2a and 2b, and 3a and 3b which are connected to the non-series connected ends of the coils 40a and 40b, 42a and 42b, and 44a and 44b, respectively, and which are used for connecting solid state switching circuitry to the phases 1, 2 and 3, respectively. For purposes of illustration, the end turn portions of coils 40a and 40b, which form phase one of the ironless multiphase armature 36, are drawn in dotted lines to demonstrate the relative locations of the various coils. Thus, current applied at terminal 1a flows into one lead of coil 40a and out the other lead to trace 72a. The current then flows from trace 72a into one of the leads of coil 40b. The current then flows out of the other lead of coil 40b and out to terminal 1b.

Figure 7A:
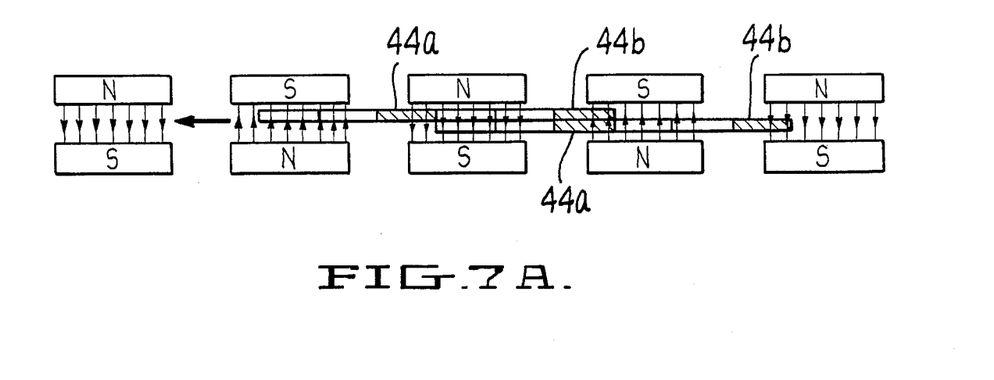
FIGS. 7A, 7B and 7C are sectional views of the "moving armature" version of the improved solid state commutated linear motor with an ironless multiphase armature shown in FIG. 1 showing the spacial relationship of the phases to the arrays of magnets before, during and after a switching sequence.
Figure 7B:
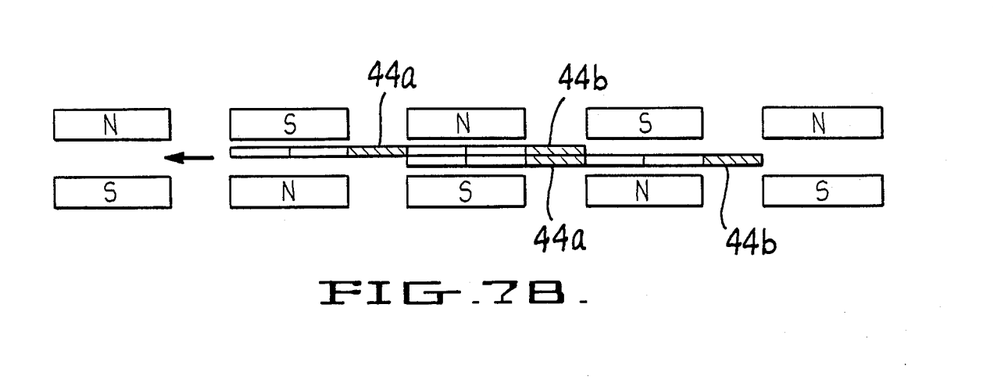
Figure 7C:
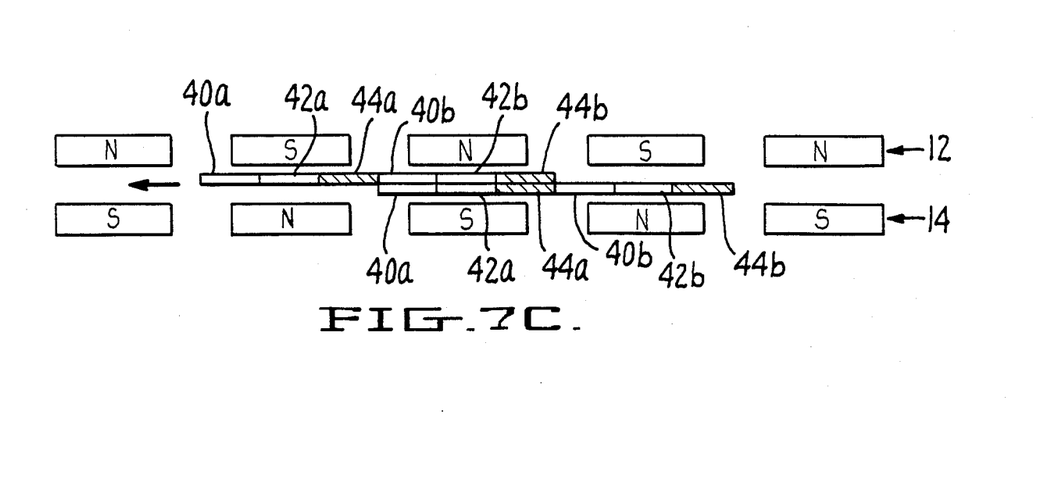

FIGS. 7A, 7B and 7C are sectional views showing the spacial relationship of the active portions of coils 40a and 40b, 42a and 42b, and 44a and 44b (phases 1, 2 and 3, respectively) to the arrays of the magnets 12 and 14 before, during and after a switching sequence, respectively, where the terminals 3a and 3b are being switched. During the switching sequence (when positioned as shown in FIG. 7B) phase 3 can be faulted as the ironless multiphase armature moves spacially over a very short distance $\delta$ (such as L divided by 100, for instance) with respect to the arrays of magnets 12 and 14. Phase 3 is shown crosshatched in the figures. This is because very few magnetic flux lines are cut by phase 3 over such a short distance and any resulting thrust perturbations are minimal. For purposes of illustration, the magnetic flux lines are drawn as arrows in FIG. 7a. Thus the new connections can be made before the old ones are broken and no momentary breaks in the series current flow through phases 1 and 2 during the switching of phase 3 will result.

Figure 8:
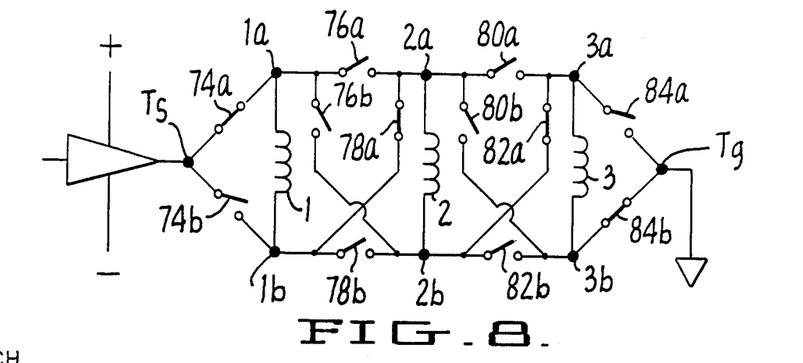
FIG. 8 is a circuit diagram for the improved solid state commutated linear motor with an ironless multiphase armature showing the disposition of solid state switches required for armature commutation.

The foregoing can be seen more clearly by referring to the improved solid state commutated linear motor circuit diagram shown in FIG. 8. This circuit diagram shows the terminals 1a, 1b, 2a, 2b, 3a and 3b as well as a servo amplifier output terminal Ts and a ground terminal Tg. The circuit diagram also shows solid state switches 74a and 74b for connecting the servo amplifier output terminal Ts to the terminals 1a and 1b, respectively; solid state switches 76a and 76b for connecting the terminal 1a to the terminals 2a and 2b, respectively; solid state switches 78a and 78b for connecting the terminal 1b to the terminals 2a and 2b respectively; solid state switches 80a and 80b for connecting the terminal 2a to the terminals 3a and 3b, respectively; solid state switches 82a and 82b for connecting the terminal 2b to the terminals 3a and 3b, respectively; and solid state switches 84a and 84b for connecting the terminals 3a and 3b to the ground terminal Tg, respectively.

In FIG. 8, the solid state switches 74a, 78a, 82a and 84b are shown in a closed position wherein the servo amplifier output terminal Ts is connected to the terminal 1a, the terminal 1b is connected to the terminal 2a, the terminal 2b is connected to the terminal 3a, and the terminal 3b is connected to the ground terminal Tg. The circuit is connected in this manner at the end of the switching sequence described above, with current passing in the forward direction through phases 1, 2 and 3. This is one possible switching state (labeled as switching state "A" in a truth table shown in FIG. 9) out of twelve possible switching states in the switching sequence as the ironless multiphase armature 20 moves along with respect to the magnetic field array 11 as shown in the truth table of FIG. 9.

Figure 9:
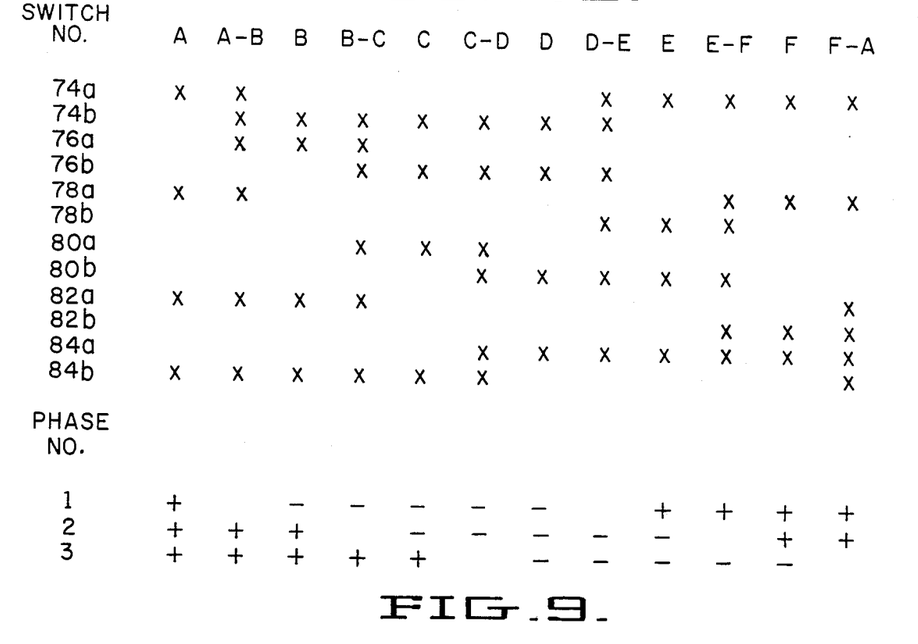
FIG. 9 is a truth table showing the state of each solid state switch with respect to the spacial positioning of the armature.

The truth table of FIG. 9 lists the twelve solid state switches 74a, 74b, 76a 76b 78a, 78b, 80a, 80b, 82a, 82b, 84a and 84b versus the twelve possible switching states referred to as A, A-B, B, B-C, C, C-D, D, D-E, E, E-F, F and F-A. The switches that are in a closed position, for each of the twelve possible switching states, are indicated by an x in the table.

As mentioned above, switching state A results in all three phases being connected in the forward direction. This is noted at the bottom of the truth table where the phases are listed versus the twelve possible switching states. Series current flow and it's direction in each of the phases is indicated by a "+", for current connection in a forward direction, or a "−", for current connection in a reverse direction, in the phases for each of the twelve possible switching states. The three "+"s listed under A indicate current connection in a forward direction for each phase.

Switching state A-B is used when the two coil per phase, three phase armature 36 is positioned at a distance L/3 in the direction of the arrow from the position shown in FIG. 7B and further includes closing switches 74b and 76a. These additional switch closures fault coil 1, thus ensuring series current flow continuity as described hereinabove. Since the current flow direction in phase 1 is indeterminate for switching state A-B, there is no entry in the bottom of the truth table for phase 1 under A-B.

Switching state B is achieved by opening the solid state switches 74a and 78a and phase 1 is then connected in the reverse di-rection as indicated by the "−" in the bottom of the truth table for phase 1 under B. Switching state B-C is required when the two coil per phase, three phase armature 36 is positioned at a distance 2L/3 in the direction of the arrow from the position shown in FIG. 7B and further includes closing switches 76b and 80a to fault coil 2. Then switching state C is achieved by opening solid state switches 76a and 82a to connect phase 2 in the reverse direction as indicated by the "−" in the bottom of the truth table for phase 2 under C. Switching state C-D is used when the three phase armature is positioned at a distance L from the position shown in FIG. 7B and further includes closing switches 80b and 84a to fault coil 3.

Switching state D is achieved by opening solid state switches 80a and 84b to connect phase 3 in the reverse direction as indicated by the "−" in the bottom of the truth table for phase 3 under D. Thus, all of the phases are connected in the reverse direction in switching state D, which is used concomitantly with the two coil per phase, three phase armature 36 being located the inter-pole distance L away from its location when switching state A is enabled.

Switching states D-E, E, E-F, F and F-A, and finally, a return to switching state A, are similarly used as the three phase armature moves further along the magnetic field array 11 by a second inter-pole distance L, as shown in the remainder of the truth table. These include switching state D-E when the three phase armature 36 is positioned at a distance 4L/3 from the position shown in FIG. 7B; switching state E-F when the three phase armature 36 is positioned at a distance 5L/3 from the position shown in FIG. 7B; and switching state F-A when the three phase armature 36 is positioned at a distance 2L from the position shown in FIG. 7B (which is, of course, also a magnetic phase position identical to that shown in FIG. 7B).

Figure 10A:
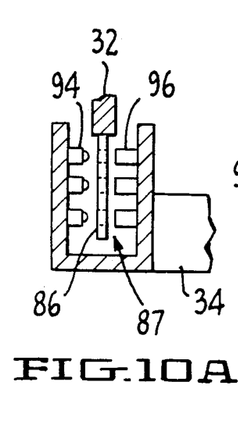
FIGS. 10A and 10B are sectional and plan views of a first type of encoder strip and diode array used for implementing the switching of each solid state switch as called for in the truth table of FIG. 9.
Figure 10B:
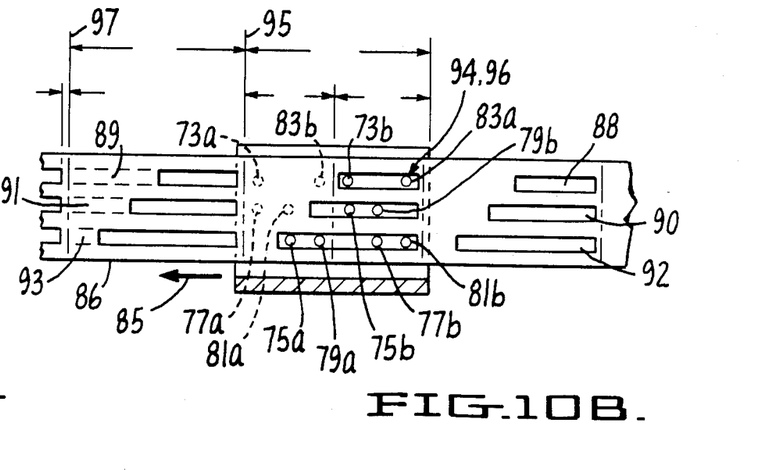

There are many ways of implementing command signals for controlling the solid state switches as called for in the truth table of FIG. 9. FIGS. 10A and 10B are sectional and plan views, respectively, of an encoder strip 86 and light emitting diode/photo- transistor array 87 of light emitting diodes 94 and phototransistors 96 used for one possible implementation. The encoder strip 86 is mounted on the machine frame 32 (as also shown in FIG. 1) and utilizes three bands of windows 88, 90 and 92 for sequentially enabling and interrupting the passage of light between twelve sets 73a, 73b, 75a, 75b, 77a, 77b 79a, 79b, 81a, 81b, 83a and 83b of the light emitting diodes 94 and phototransistors 96. The light emitting diode/phototransistor array 87 is mounted on the machine slide 34 for movement therewith and each set 73a, 73b, 75a, 75b, 77a, 77b, 79a, 79b, 81a, 81b, 83a or 83b of light emitting diodes 94 and phototransistors 96 is utilized for enabling the closing of solid state switch 74a, 74b, 76a, 76b, 78a, 78b, 80a, 80b, 82a, 82b, 84a and 84b, respectively, whenever light passage is interrupted for the corresponding set of light emitting diode 94 and phototransistor 96 as the machine slide 34 moves along relative to the machine frame 32. Each of the three bands of windows 88, 90 and 92 are spaced at intervals of 2L to coincide spacially with a complete cycle of the truth table. The spaces 89 between the windows 88 are L +2δ in length and are used to enable the solid state switches 74a, 74b, 84a and 84b. The spaces 91 between the windows 90 are 2L/3 +2δ in length and are used to enable the solid state switches 76a, 78b, 80a and 82b. The spaces 93 between the windows 92 are L/3 +2δ in length and are used to enable the solid state switches 76b, 78a, 80b and 82a.

FIG. 10B shows the light emitting diode/phototransistor array 87 positioned as required for switching state "A". If the light emitting diode/phototransistor array 87 is moved toward the left as indicated by arrow 85, then light passage between the various sets of light emitting diodes 94 and phototransistors 96 will be sequentially enabled and interrupted as required for the sequential attainment of switching states A-B, B, B-C, C, C-D, D, D-E, E, E-F, F and F-A as required by the truth table of FIG. 9. By way of example, light passage between a light emitting diode 94 and a phototransistor 96 comprising set 73a must be interrupted to enable the closure of the solid state switch 74a during the switching states A, A-B, D-E, E, E-F, F and F-A. As the set 73a moves toward the left it reaches a position corresponding to the switching state A-B at line 95. It next enters a window 88 which encompasses positions corresponding to the switching states B, B-C, C, C-D and D. Its next position corresponds to the switching state D-E at line 97. Finally, it moves through the space 89 which encompasses positions corresponding to the switching states E, E-F, F and F-A as well as the afore mentioned switching states A, A-B and D-E.

Figure 11:
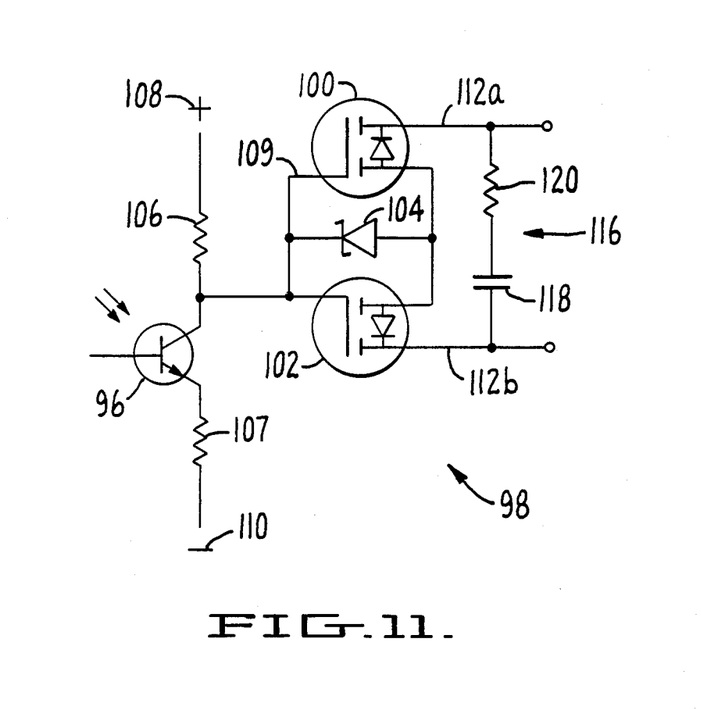
FIG. 11 is a circuit diagram showing a solid state switch utilized for switching in a bi-directional manner.

FIG. 11 shows a circuit diagram of a solid state switch 98 which can be utilized for performing solid state switching according to a preferred embodiment of this invention. The solid state switch 98 utilizes two N channel metal-oxide-semiconductor field-effect-transistors (MOSFETs) 100 and 102, series connected source-to-source with a common gate connection, as its switching elements. One example of a suitable device usable as the N channel MOSFETs 100 and 102 is a model number MTH35N05 N channel MOSFET with 35 ampere, 50 volt, and on resistance (drain-source) of 0.055 ohm specifications, available from the Motorola Semiconductor Group of Phoenix, Arizona. (Note that such a series connection of two N channel MOSFETs will conduct in either direction because the backward biased one of the pair has an internal source-to-drain diode inherent in its construction.) Other elements of the solid state switch 98 include a zener diode 104 connected gate-to-source in its breakdown direction, a resistor 106 connected between a positive supply voltage source 108 and the gate lead, and one of the phototransistors 96 connected between the gate lead and a resistor 107, which is connected to a negative supply voltage source 110, wherein the positive and negative supply voltages 108 and 110, respectively, exceed the extremes of voltage present within the ironless multiphase armature 20 by a margin that is sufficient for the modes of operation described hereinbelow.

In a first mode of operation, the solid state switch 98 is placed in the open condition by enabling the passage of light to the phototransistor 96 to place it in an "on" state. This is because both the gate and the source leads then have negative voltage with respect to either drain lead, which turns off both the N channel MOSFETs 100 and 102. Conversely, in a second mode of operation, the solid state switch 98 is placed in closed condition by interrupting the passage of light to the phototransistor 96 to place it in an "off" state. This is because positive voltage is placed on the common gate lead of the N channel MOSFETs 100 and 102 relative to the common source lead. Sufficiently high positive voltage for this purpose is ensured by selecting the voltage value of the positive voltage supply source 108 high enough to break down the zener diode 104 wherein the flow of current through the zener diode 104 is limited by the resistor 106. The values provided in FIG. 11 for the components are not critical but representative values include a 10 Megohm resistance value for the resistors 106 and 107, and perhaps a 10 volt break down voltage for the zener diode 104.

Additionally, a snubber circuit 116 is positioned across drain leads 112a and 112b of the N channel MOSFETs 100 and 102, respectively. This is to protect the solid state switch 98 from inductive-load-switching-originated voltage surges. These surges can occur because of the very fast turnoff characteristics of the N channel MOSFETs 100 and 102, and the inductance of the motor leads and phases. The snubber circuit 116 is comprised of a capacitor 118 and a resistor 120. The values chosen are dependent on parameters such as the actual switching characteristics, the inductance, and the magnitude of the peak voltages allowed but typical values can be as large as 5 μfarads for the capacitor 118 and as small as 0.1 ohms for the resistor 120 depending on the phase impedance.

Figure 12:
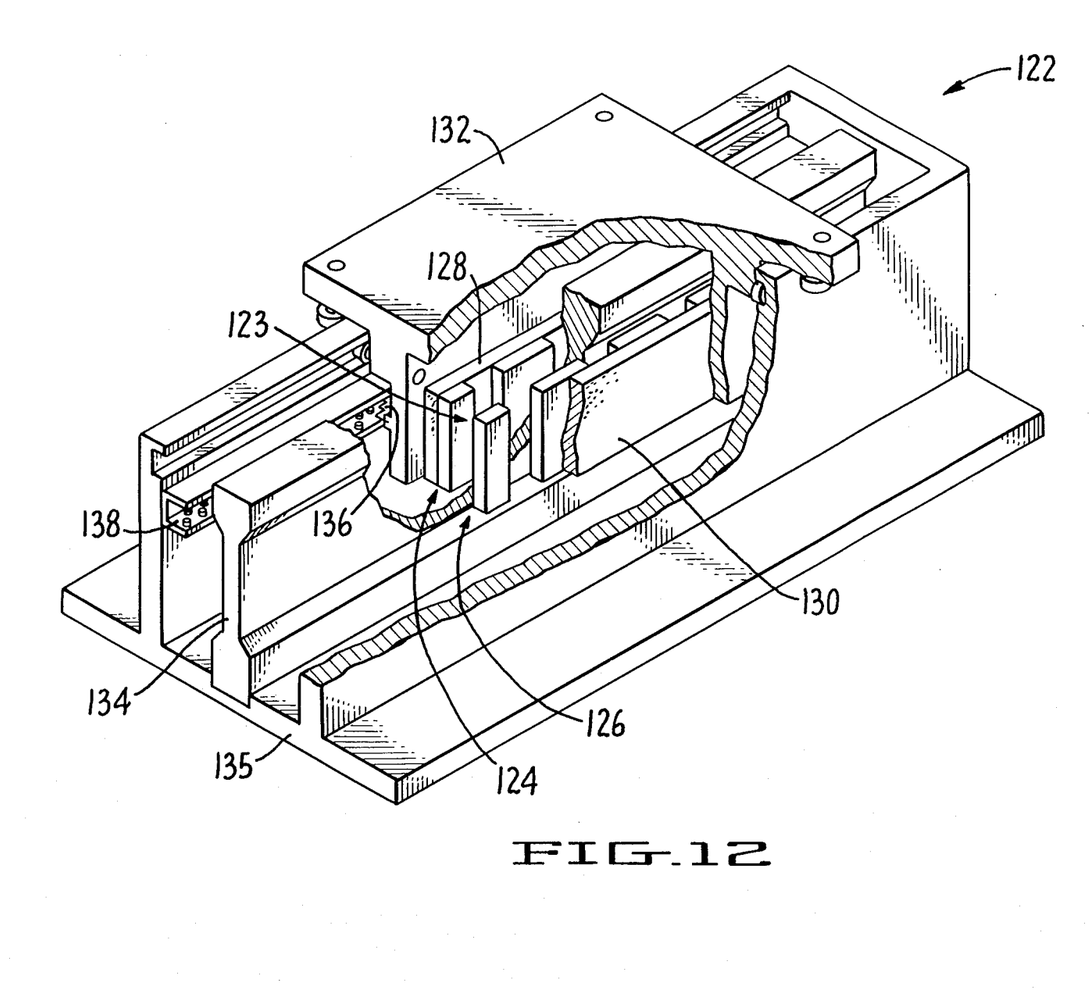
FIG. 12 is an isometric drawing of a "moving field" version of the improved solid state commutated linear motor with an ironless multiphase armature in accordance with an alternative embodiment of the present invention.

Referring now to FIG. 12, there is shown an improved solid state commutated linear motor with an ironless multiphase armature 122 of a "moving field" configuration comprising a foreshortened magnetic field array 123 which, in turn, comprises two foreshortened arrays of magnets 124 and 126 mounted on ferromagnetic bars 128 and 130. The ferromagnetic bars 128 and 130 are mounted on a machine slide 132, and an elongated ironless multiphase armature 134 is mounted on a machine frame 135. Both the arrays of magnets 124 and 126, and the ironless multiphase armature 134 are formed in an identical manner to those described hereinbefore and function identically as well. The choice between "moving armature" and "moving field" configurations is based on factors of relative economics or considerations of relative weight, heat or magnetic field distribution.

The most efficient way to operate the improved solid state commutated linear motor with an ironless multiphase armature 122 is to bring out leads from each coil or selected groups of coils and switch them independently. This method of operation minimizes heat buildup in the ironless multiphase armature 134.

Figure 13:
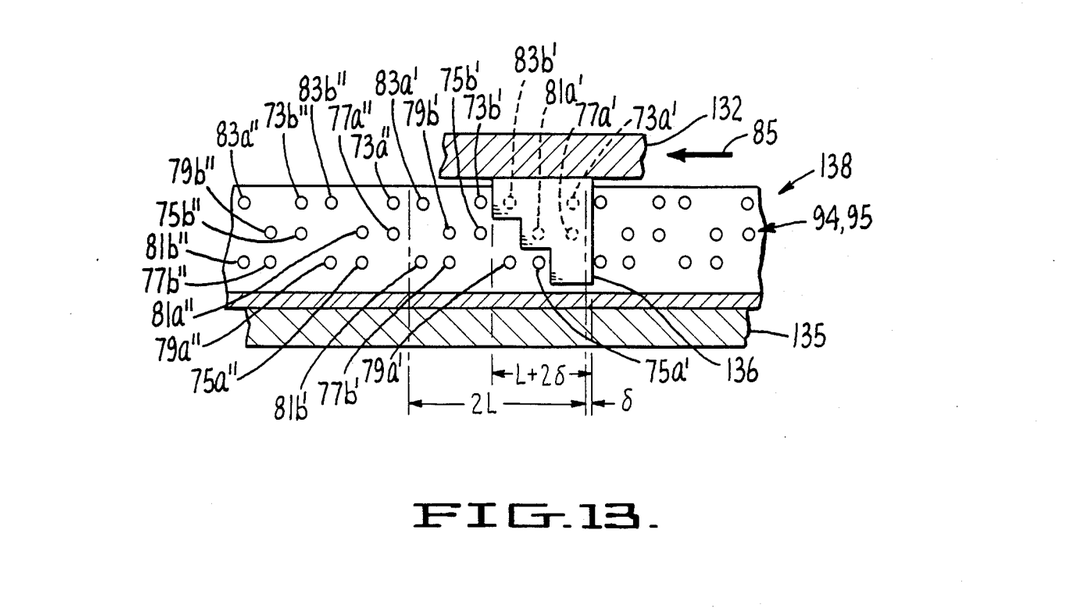
FIG. 13 is a plan view of a second type of encoder strip and diode array used for implementing the switching of each solid state switch as called for in the truth table of FIG. 9 wherein the encoder strip and diode array are modified for use with a more efficiently switched ironless multiphase armature of the "moving field" version of the improved solid state commutated linear motor with an ironless multiphase armature shown in FIG. 12.

FIG. 13 is a plan view of an encoder strip 136 and light emitting diode/phototransistor array 138 which can be used for this purpose. In this case the encoder strip 136 can be fabricated from a thin opaque material and has a stepped format with an overall length of L+2 wherein the steps are each of length L/3. The encoder strip 136 is mounted on the machine slide emitting diode/phototransistor array 138 is mounted on the machine frame 135, extends over the length of travel of the machine slide 132, and comprises multiple sets of light emitting diodes 94 and phototransistors 96. Since the encoder strip 136 is the moving element in this embodiment (as shown by the arrow 85), the entire pattern of the light emitting diode/phototransistor array 138 and the encoder strip 136 is arranged in a mirrored fashion as compared with the light emitting diode/phototransistor array 87 and the encoder strip 86 of the first embodiment. The encoder strip 136 is shown positioned over a first set of light emitting diodes 94 and phototransistors 96 of the light emitting diode/phototransistor array 138 as indicated by single primes. As it moves over the length of travel of the machine slide 132 it will selectively utilize other sets of light emitting diodes 94 and phototransistors 96 as indicated by the double primes.

The terms and expressions employed herein are used as terms of description and not of limitation, and there is no intention, in the use of such terms and expressions of excluding equivalents of the features shown and described, or portions thereof, it being recognized that various modifications are possible within the scope of the invention claimed.

I claim:

1. Linear motor apparatus for driving a machine slide with respect to a machine frame comprising:

means for supporting and guiding the machine slide for movement with respect to the machine frame along a first axis;

magnetic field array means disposed along the first axis and fixedly located with respect to the machine frame for providing a plurality of magnetic poles which generate a magnetic field of periodic alternating polarity, where the distance between adjacent poles of the plurality of magnetic poles is equal to an inter-pole distance L, and further wherein the magnetic field array means provide magnetic field lines parallel to a second axis which is orthogonol to the first axis; and a multiphase armature also disposed along the first axis but fixedly located with respect to the machine slide, said multiphase armature having a plurality of phases which are spaced successively along the first axis, wherein each phase is formed of at lease a first coil, said first coil having first and second active portions with center lines that are separated from one another by a distance substantially equal to the inter-pole distance L, and further wherein the first and second active portions extend across the magnetic field array means in a direction parallel to a third axis such that they are encompassed by the magnetic field lines of the magnetic field array means, said third axis being orthogonal to the second axis, and further wherein, the first active portion of any one of the phases is located relative to the first active portion of a successively positioned phase at a distance equal to the inter-pole distance L divided by the number of phases present in the multiphase armature and further wherein any additional coils used in forming a phase are located, with respect to the other coils that form the phase, at the inter-pole spacing L.

2. A linear motor apparatus as in claim 1 wherein the magnetic field array comprises a pair of ferromagnetic bars with an array of magnets arranged so that north poled magnets alternate with south poled magnets an extend along the first axis, and wherein the array of magnets is mounted on a surface of a first one of the pair of ferromagnetic bars said surface facing the second one of the ferromagnetic bars.

3. A linear motor apparatus as in claim 2 wherein the array of magnets is a spaced array of magnets wherein each magnet of the spaced array of magnets is spaced from the next magnet of the spaced array of magnets by a distance equal to the inter-pole distance L divided by the number of phases.

4. A linear motor, apparatus as in claim 3 wherein the magnets at each end of the spaced array of magnets has a width one-half that of the other magnets of the spaced array of magnets.

5. A linear motor apparatus as in claim 1 wherein the magnetic field array means comprises a pair of ferromagnetic bars;

two arrays of magnets each having alternate north poled magnets and south poled magnets extending along the first axis, wherein each array of alternate north poled and south poled magnets is mounted on the ferromagnetic bars so that the two arrays of magnets are positioned such that each north poled magnet of either array of magnets is located opposite a south poled magnet of the other array of magnets.

6. A linear motor apparatus as in claim 5 wherein each array of magnets is a spaced array of magnets wherein each magnet of each spaced array of magnets is spaced from the next magnet of that spaced array of magnets by a distance equal to the inter-pole distance L divided by the number of phases.

7. A linear motor apparatus as in claim 6 wherein the magnets at the ends of each spaced array of magnets are half the width of the other magnets of that spaced array of magnets.

8. A linear motor apparatus as in claim 1, wherein the machine slide is translatable over a length of travel, and further wherein the length of the magnetic field array is equal to or longer than the length of the multiphase armature plus the length of travel of the machine slide.

9. A linear motor apparatus as in claim 1 wherein the various coils comprising the phases of the multiphase armature are interleaved and staggered with respect to one another.

10. A linear motor apparatus as in claim 9 wherein width of the active portions of each of the coils is equal to the inter-pole distance L divided by the number of phases.

11. A linear motor apparatus as in claim 9 wherein the active portions of each coil are located in different planes and joined together by end turns which slope from an active portion of a coil to the other active portion of the coil to accommodate the positioning of selected portions of the end turns of the coils of a number of coils equal to the number of phases plus one.

12. A linear motor apparatus as in claim 9 wherein each coil of the multiphase armature is formed to have a pair of leads for receiving energizing current and further wherein both leads emerge from outside faces of the coil.

13. A linear motor apparatus as in claim 1 wherein the magnetic field of the magnetic field array means alternates between a magnetic field forward position and a magnetic field reversal position, including means for commutating the phases of the multiphase armature, said commutating means comprising a plurality of solid state switches that form connections between each of the phases and an energizing source as the multiphase armature moves spatially along the magnetic field array and further wherein the commutating means reverses the connections of a phase as the phase leaves a magnetic field reversal position between the magnetic field array means.

14. A linear motor apparatus as in claim 13 wherein the commutating means include an encoder strip mounted on the machine frame and having selected bands of windows which sequentially enable and interrupt the passage of light to an array of sensors mounted on the machine slide.

15. A linear motor apparatus as in claim 14 wherein the array of sensors controls the state of each of the plurality of solid state switches that form the connections to each of the phases of the multiphase armature of the linear motor apparatus.

16. A linear motor apparatus as in claim 15 wherein the array of sensors comprises a number of sensors equal to the number of solid state switches.

17. A linear motor apparatus as in claim 13 wherein the number of solid state switches is equal to four times the number of phases of the multiphase armature of the linear motor apparatus.

18. A linear motor apparatus as in claim 14 wherein the sensors are phototransistors.

19. A linear motor apparatus as in claim 13 wherein the solid state switches comprise two MOSFETs connected source-to-source with a common gate connection, wherein the gate-to-source voltage is regulated by a zener diode having a zener voltage so that the zener voltage is applied as the gate-to-source voltage of the MOSFETs when the solid state switch is in an "on" state and a reversed diode drop voltage is applied to the MOSFETs when the solid state switch is in an "off" state.

20. A method of commutating the phases of the linear motor apparatus of claim 1 as the multiphase armature moves spatially along the magnetic field array wherein a phase is faulted as it approaches a magnetic field reversal position between magnetic poles of the magnetic field array means and then the connections of that phase are reversed as it leaves the magnetic field reversal position.

21. Linear motor apparatus for driving a machine slide with respect to a machine frame comprising:
  means for supporting and guiding the machine slide for movement with respect to the machine frame along a first axis;
  a multiphase armature disposed along the first axis and fixedly located with respect to the machine frame, said multiphase armature having at least two phase which are spaced successively along the first axis.
    wherein each phase comprises a plurality of coils, each coil having first and second active portions with center lines that are separated from one another by a distance substantially equal to an inter-pole distance L, where the first and second active portions extend in a direction parallel to a second axis, said phases being positioned such that adjoining first and second active portions of successive phases are located relative to one another at a distance equal to the inter-pole distance L divided by the number of phases present in the multiphase armature, and the additional coils in each of the phases are located at the inter-pole spacing L with respect to each other; and
  magnetic field array means disposed along the first axis and fixedly located with respect to the machine slide, for providing a plurality of magnetic poles which generate a magnetic field of periodic alternating polarity wherein centers of each of the plurality of magnetic poles are located at the inter-pole distance L, and further wherein the magnetic field array means provide magnetic field lines parallel to a third axis which is orthogonal to the second axis and encompass the active portions of the coils located concomitantly along the first axis.

22. A linear motor apparatus as in claim 21 wherein the magnetic field array means comprises a pair of ferromagnetic bars with an array of magnets arranged so that north poled magnets alternate with south poled magnets and extend along the first axis, and wherein the array of magnets is mounted on a surface of a first one of the pair of ferromagnetic bars, said surface facing the second one of the ferromagnetic bars.

23. A linear motor apparatus as in claim 22 wherein the array of is a spaced array of magnets wherein each magnet of the spaced array of magnets is spaced from the next magnet of the spaced array of magnets by a distance equal to the inter-pole distance L divided by the number of phases.

24. A linear motor apparatus as in claim 23 wherein the magnets at each end of the spaced array of magnets have a width one half that of the other magnets of the spaced array of magnets.

25. A linear motor apparatus as in claim 21 wherein said magnetic field array means comprises
  a pair of ferromagnetic bars;
  two arrays of magnets each having alternate north poled magnets and south poled magnets extending along the first axis, wherein each array of alternate north poled and south poled magnets is mounted on a surface of one of the ferromagnetic bars which faces a surface of the other one of the ferromagnetic bars and wherein the two arrays of magnets are positioned such that each north poled magnet of either array of magnets is located opposite a south poled magnet of the other array of magnets.

26. A linear motor apparatus as in claim 25 wherein each array of is a spaced array of magnets wherein each magnet of each spaced array of magnets is spaced from the next magnet of that spaced array of magnets by a distance equal to the inter-pole distance L divided by the number of phases.

27. A linear motor apparatus as in claim 26 wherein the magnets at the ends of each spaced array of magnets are half the width of the other magnets of that spaced array of magnets.

28. A linear motor apparatus as in claim 21, wherein the machine slide is translatable over a length of travel, and further wherein the length of the multiphase armature is equal to or longer than the length of the magnetic field array plus the length of travel of the machine slide.

29. A linear motor apparatus as in claim 21 wherein the various coils comprising the phases of the multiphase armature are interleaved and staggered with respect to one another.

30. A linear motor apparatus as in claim 29 wherein the width of each of the two active portions of each of the coils is equal to the inter-pole distance L divided by the number of phases.

31. A linear motor apparatus as in claim 29 wherein the active portions of each coil are located in different parallel planes and joined together by end turns which slope from an active portion of a coil to the other active portion of the coil to accommodate the positioning of selected portions of the end turns of the coils of a number of coils equal to the number of phases plus one.

32. A linear motor apparatus as in claim 29 wherein each coil of the multiphase armature is formed to have a pair of leads for receiving energizing current and further wherein both leads emerge from outside faces of the coil.

33. A linear motor apparatus as in claim 21 wherein the magnetic field of the magnetic field array means alternates between a magnetic field forward position and a magnetic field reversal position, including means for commutating the phases of the multiphase armature, said commutating means comprising a plurality of solid state switches that form connections between each of the phases of the multiphase armature and an energizing source as the magnetic field array moves spatially along the multiphase armature, and further wherein the commutating means reverses the connections of that phase as the magnetic field reversal position between the magnetic poles of magnetic field array means leaves that phase.

34. A linear motor apparatus as in claim 33 wherein the commutating means include an encoder strip mounted on the machine frame and having selected bands of windows which sequentially enable and interrupt the passage of light to an array of sensors mounted on the machine slide.

35. A linear motor apparatus as in claim 34 wherein the array of sensors controls the state of each of the plurality of solid state switches that form the connections to each of the phases of the multiphase armature of the linear motor apparatus.

36. A linear motor apparatus as in claim 35 wherein the array of sensors comprises a number of sensors equal to the number of solid state switches.

37. A linear motor apparatus as in claim 33 wherein an encoder strip mounted on the machine slide and having selected bands of windows is utilized to sequentially enable and interrupt the passage of light to an array of sensors mounted on the machine frame for controlling said commutation.

38. A linear motor apparatus as in claim 37 wherein the array of sensors controls the state of each of the plurality of solid state switches that form the connections to each of the phases of the multiphase armature of the linear motor apparatus.

39. A linear motor apparatus as in claim 38 wherein the array of sensors comprises a number of sensors equal to the number of solid state switches.

40. A linear motor apparatus as in claim 33 wherein the number of solid state switches is equal to four times the number of phases of the ironless multiphase armature of the linear motor apparatus.

41. A linear motor apparatus as in claims 34 or 37 wherein the sensors are phototransistors.

42. A linear motor apparatus as in claim 33 wherein the solid state switches comprise two MOSFETs connected source-to-source with a common gate connection, wherein the gate-to-source voltage is regulated by a zener diode having a zener voltage so that the zener voltage is applied as the gate-to-surface voltage of the MOSFETs when the solid state switch is in an "on" state and a reversed diode drop voltage is applied to the MOSFETs when the solid state switch is in an "off" state.

43. A method of commutating the phases of the linear motor apparatus of claim 21 as the magnetic field array moves spatially along the multiphase armature wherein a phase is faulted as a magnetic field reversal position between magnetic poles of the magnetic field array means approaches that phase, and then the connections of that phase are reversed as the magnetic field reversal position between the magnetic poles.

44. The linear motor apparatus of claim 12 wherein the commutating means further includes means for faulting a phase as it approaches a magnetic field reversal position of the magnetic field array means.

45. The linear motor apparatus of claim 21 wherein the commutating means further includes means for faulting a phase as it approaches a magnetic field reversal position of the magnetic field array means.

* * * * *